(12) United States Patent
Kobayashi et al.

(10) Patent No.: US 10,998,135 B2
(45) Date of Patent: May 4, 2021

(54) CERAMIC ELECTRONIC COMPONENT WITH CRACK PROTECTION AND PRODUCTION METHOD THEREFOR

(71) Applicant: Taiyo Yuden Co., Ltd., Tokyo (JP)

(72) Inventors: Satoshi Kobayashi, Tokyo (JP); Takahisa Fukuda, Tokyo (JP); Tomoaki Nakamura, Tokyo (JP); Mikio Tahara, Tokyo (JP); Naoki Saito, Tokyo (JP); Kiyoshiro Yatagawa, Tokyo (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 35 days.

(21) Appl. No.: 16/415,592

(22) Filed: May 17, 2019

(65) Prior Publication Data

US 2019/0362895 A1 Nov. 28, 2019

(30) Foreign Application Priority Data

May 22, 2018 (JP) .............................. JP2018-097734

(51) Int. Cl.
*H01G 4/232* (2006.01)
*H01G 4/30* (2006.01)

(52) U.S. Cl.
CPC ............ *H01G 4/2325* (2013.01); *H01G 4/30* (2013.01)

(58) Field of Classification Search
None
See application file for complete search history.

(56) References Cited

U.S. PATENT DOCUMENTS

| 5,963,416 | A | * | 10/1999 | Honda | .................. | H01C 7/008 |
| | | | | | | 29/25.42 |
| 6,100,110 | A | * | 8/2000 | Kawase | ................. | H01C 1/142 |
| | | | | | | 438/54 |
| 10,395,839 | B1 | * | 8/2019 | Park | ...................... | H01G 4/232 |
| 10,395,840 | B1 | * | 8/2019 | Park | ...................... | H01G 4/224 |
| 10,446,320 | B2 | * | 10/2019 | Kim | ........................ | H01G 4/30 |
| 10,622,151 | B2 | * | 4/2020 | Kobayashi | ............ | H05K 1/111 |
| 10,847,315 | B2 | * | 11/2020 | Inoue | ................... | H01G 4/1227 |
| 2010/0067170 | A1 | * | 3/2010 | Koga | .................... | H01G 4/228 |
| | | | | | | 361/306.3 |
| 2014/0233147 | A1 | * | 8/2014 | Hong | .................... | H01G 4/008 |
| | | | | | | 361/301.4 |

(Continued)

FOREIGN PATENT DOCUMENTS

| JP | 08-107039 A | 4/1996 |
| JP | 11-219849 A | 8/1999 |

*Primary Examiner* — Binh B Tran
*Assistant Examiner* — Muhammed Azam
(74) *Attorney, Agent, or Firm* — Chip Law Group

(57) ABSTRACT

A ceramic electronic component includes external electrodes having conductive resin layers thereinside on respective two ends opposed to each other in a rectangular parallelepiped ceramic component body. Each of the external electrodes includes an underlying metal layer, an intermediate metal layer, a conductive resin layer, an external metal layer. A tip angle α between an outer face of a tip portion of the wraparound portion of the underlying metal layer and a surface of the ceramic component body is 20° or smaller, and a tip angle β between an outer face of a tip portion of the wraparound portion of the intermediate metal layer and a surface of the ceramic component body is 20° or smaller.

14 Claims, 4 Drawing Sheets

(56) References Cited

U.S. PATENT DOCUMENTS

| | | | | |
|---|---|---|---|---|
| 2014/0284091 | A1* | 9/2014 | Fujii | H01G 4/30 |
| | | | | 174/260 |
| 2015/0084487 | A1* | 3/2015 | Mori | H01L 41/0472 |
| | | | | 310/364 |
| 2015/0092316 | A1* | 4/2015 | Chun | H01G 4/30 |
| | | | | 361/301.4 |
| 2015/0243438 | A1* | 8/2015 | Ahn | H01G 4/30 |
| | | | | 174/258 |
| 2015/0279566 | A1* | 10/2015 | Otani | H01G 4/012 |
| | | | | 361/301.4 |
| 2017/0330689 | A1* | 11/2017 | Hatanaka | H01G 4/30 |
| 2018/0190433 | A1* | 7/2018 | Cho | H01G 4/012 |
| 2019/0180938 | A1* | 6/2019 | Tahara | H01G 4/2325 |
| 2019/0362895 | A1* | 11/2019 | Kobayashi | H01G 4/2325 |
| 2020/0161048 | A1* | 5/2020 | Chun | H01G 4/012 |

* cited by examiner

PRIOR ART

FIG.5

| PROTOTYPE | TIP ANGLE α | TIP ANGLE β | CONTINUITY | CRACKING | CRACK ANGLE θ | COMPREHENSIVE EVALUATION |
|---|---|---|---|---|---|---|
| TP1 | 1° | 0.5° | BAD | — | — | BAD |
| TP2 | 2° | 1° | BAD | — | — | BAD |
| TP3 | 3° | 3° | GOOD | 0/30 | — | GOOD |
| TP4 | 4° | 7° | GOOD | 0/30 | — | GOOD |
| TP5 | 5° | 10° | GOOD | 0/30 | — | GOOD |
| TP6 | 8° | 15° | GOOD | 0/30 | — | GOOD |
| TP7 | 10° | 15° | GOOD | 0/30 | — | GOOD |
| TP8 | 14° | 15° | GOOD | 0/30 | — | GOOD |
| TP9 | 18° | 18° | GOOD | 0/30 | — | GOOD |
| TP10 | 18° | 20° | GOOD | 0/30 | — | GOOD |
| TP11 | 20° | 20° | GOOD | 0/30 | — | GOOD |
| TP12 | 20° | 23° | GOOD | 1/30 | 66° | BAD |
| TP13 | 23° | 20° | GOOD | 3/30 | 68° | BAD |
| TP14 | 25° | 30° | GOOD | 2/30 | 66° | BAD |
| TP15 | 31° | 41° | GOOD | 2/30 | 65° | BAD |
| TP16 | 31° | 44° | GOOD | 8/30 | 65° | BAD |

ABSTRACT

CERAMIC ELECTRONIC COMPONENT WITH CRACK PROTECTION AND PRODUCTION METHOD THEREFOR

CROSS REFERENCE TO RELATED APPLICATION

This application is based upon and claims benefit of priority from Japanese Patent Application No. 2018-097734, filed on May 22, 2018, the entire contents of which are incorporated herein by reference.

BACKGROUND

The present disclosure relates to a ceramic electronic component including external electrodes having conductive resin layers thereinside on respective two ends opposed to each other in a rectangular parallelepiped ceramic component body, and a ceramic electronic component production method.

In relation to the ceramic electronic component, a multilayer ceramic capacitor illustrated in FIG. 1A is known (see FIG. 2 in Japanese Patent Laid-Open No. Hei 11-219849 (hereinafter referred to as Patent Document 1)). This multilayer ceramic capacitor includes external electrodes 120 having conductive resin layers 122 thereinside on respective two ends opposed to each other in a rectangular parallelepiped ceramic component body 110. The ceramic component body 110 includes a capacitance portion in which a plurality of internal electrode layers 111 (a total of six layers in the figure) have been laminated through dielectric layers 112 (a total of five layers in the figure). Each external electrode 120 has a rectangular end face portion 120a on each of end faces in a lengthwise direction (crosswise direction in FIG. 1A) of the ceramic component body 110, and a rectangular cylindrical wraparound portion 120b on respective parts of four faces around the end face, which are continuously formed. The external electrode 120 is composed of an underlying metal layer 121, the conductive resin layer 122, and an external metal layer 123.

Each underlying metal layer 121 has a rectangular end face portion 121a covering each of the end faces in the lengthwise direction of the ceramic component body 110, and a rectangular cylindrical wraparound portion 121b on respective parts of four faces around the end face, which are continuously formed. In addition, each conductive resin layer 122 has a rectangular end face portion 122a covering each end face portion 121a of the underlying metal layer 121, and a rectangular cylindrical wraparound portion 122b covering each wraparound portion 121b of the underlying metal layer 121, which are continuously formed. A value obtained by subtracting a thickness of the end face portion 122a from a length of the wraparound portion 122b is larger than a length of the wraparound portion 121b of the underlying metal layer 121. Furthermore, each external metal layer 123 has a rectangular end face portion 123a covering each end face portion 122a of the conductive resin layer 122, and a square cylindrical wraparound portion 123b covering each wraparound portion 122b of the conductive resin layer 122, which are continuously formed.

Incidentally, a multilayer ceramic capacitor including an external electrode having another metal layer between the underlying metal layer 121 and the conductive resin layer 122 is also known (see FIG. 3 in Japanese Patent Laid-Open No. Hei 08-107039 (hereinafter referred to as Patent Document 2)), but the value obtained by subtracting the thickness of the end face portion 122a from the length of the wraparound portion 122b of the conductive resin layer 122 is not larger than the length of the wraparound portion 121b of the underlying metal layer 121.

After the multilayer ceramic capacitor illustrated in FIG. 1A is mounted on a circuit board, specifically after each external electrode 120 is connected to each conductive pad corresponding to an external electrode of the circuit board using a bonding material such as a solder, even when a stress caused by deflection due to an external force of the circuit board, expansion or contraction due to heat of the circuit board, expansion or contraction due to electrostriction of the ceramic component body 110, or the like is applied to a connection part, the stress can be relaxed by the conductive resin layer 122 of each external electrode 120. That is, the direct stress to the ceramic component body 110 is avoided, so that cracks on the ceramic component body 110 due to the stress can be suppressed. In addition, since the value obtained by subtracting the thickness of the end face portion 122a from the length of the wraparound portion 122b in each external electrode 120 is larger than the length of the wraparound portion 121b of the underlying metal layer 121, the wraparound portion 122b can secure a high stress relaxation ability for the conductive resin layer 122.

Incidentally, it has been confirmed that, even in the multilayer ceramic capacitor illustrated in FIG. 1A, a crack CR illustrated in FIG. 1B occurs on the ceramic component body 110 when the connection part is repeatedly stressed or excessively stressed after mounting the ceramic capacitor on the circuit board. In addition, it has been confirmed that a base point of the crack CR is a tip of the wraparound portion 121b of the underlying metal layer 121, and furthermore multilayer ceramic capacitors of the same size have approximately the same crack angles θ relative to the surface of the ceramic component body 110.

SUMMARY

The problem to be solved by the present disclosure is to provide a ceramic electronic component which can prevent occurrence of cracks on a ceramic component body as much as possible even when a connection part is repeatedly stressed or excessively stressed after mounting the ceramic electronic component on a circuit board, and a ceramic electronic component production method.

In order to solve the above problem, the ceramic electronic component according to the present disclosure is a ceramic electronic component including external electrodes having conductive resin layers thereinside on respective two ends opposed to each other in a rectangular parallelepiped ceramic component body. When an opposing direction of two faces opposed to each other in the ceramic component body is defined as a first direction, an opposing direction of other two faces opposed to each other is defined as a second direction, an opposing direction of the remaining other two faces opposed to each other is defined as a third direction, and dimensions along respective directions are defined as a first direction dimension, a second direction dimension, and a third direction dimension respectively, each of the external electrodes includes: (1) an underlying metal layer having an end face portion covering each end face in the first direction of the ceramic component body and a wraparound portion covering the respective parts of four faces around the end face that are continuously formed; (2) an intermediate metal layer having an end face portion covering each end face portion of the underlying metal layer and a wraparound portion covering each wraparound portion of the underlying metal layer that are continuously formed; (3) a conductive resin layer having an end face portion covering each end face portion of the intermediate metal layer and a wraparound portion covering each wraparound portion of the intermediate metal layer that are continuously formed, in which a value obtained by subtracting a thickness of the end face portion from the first direction dimension of the wraparound portion is larger than the first direction dimension of the wraparound portion of the intermediate metal layer; (4) an external metal layer having an end face portion covering each end face portion of the conductive resin layer and a wraparound portion covering each wraparound portion of the conductive resin layer that are continuously formed, and on at least a mounting side part of the wraparound portion of the underlying metal layer and on at least a mounting side part of the wraparound portion of the intermediate metal layer, a tip angle α between an outer face of a tip portion of the wraparound portion of the underlying metal layer and a surface of the ceramic component body is 20° or smaller, and a tip angle β between an outer face of a tip portion of the wraparound portion of the intermediate metal layer and a surface of the ceramic component body is 20° or smaller.

The ceramic electronic component production method according to the present disclosure is a production method for a ceramic electronic component including external electrodes having the conductive resin layers thereinside on the respective two ends opposed to each other in a rectangular parallelepiped ceramic component body. When an opposing direction of two faces opposed to each other in the ceramic component body is defined as a first direction, an opposing direction of other two faces opposed to each other is defined as a second direction, an opposing direction of the remaining other two faces opposed to each other is defined as a third direction, and dimensions along respective directions are defined as a first direction dimension, a second direction dimension, and a third direction dimension respectively, each of the external electrodes includes: (1) an underlying metal layer having an end face portion covering each end face in the first direction of the ceramic component body and a wraparound portion covering the respective parts of four faces around the end face that are continuously formed; (2) an intermediate metal layer having an end face portion covering each end face portion of the underlying metal layer and a wraparound portion covering each wraparound portion of the underlying metal layer that are continuously formed; (3) a conductive resin layer having an end face portion covering each end face portion of the intermediate metal layer, and a wraparound portion covering each wraparound portion of the intermediate metal layer that are continuously formed, in which a value obtained by subtracting a thickness of the end face portion from the first direction dimension of the wraparound portion is larger than the first direction dimension of the wraparound portion of the intermediate metal layer; (4) an external metal layer having an end face portion covering each end face portion of the conductive resin layer and a wraparound portion covering each wraparound portion of the conductive resin layer that are continuously formed, and on at least a mounting side part of the wraparound portion of the underlying metal layer and on at least a mounting side part of the wraparound portion of the intermediate metal layer, a tip angle α between an outer face of a tip portion of the wraparound portion of the underlying metal layer and a surface of the ceramic component body is 20° or smaller, and a tip angle β between an outer face of a tip portion of the wraparound portion of the intermediate metal layer and a surface of the ceramic component body is 20° or smaller.

The ceramic electric component according to the present disclosure makes it possible to prevent cracking on the ceramic component body as much as possible even when the connection part is repeatedly stressed or excessively stressed after mounting the ceramic electronic component on the circuit board. In addition, the ceramic electronic component production method according to the present disclosure can makes it possible to properly produce the ceramic electronic component.

BRIEF DESCRIPTION OF THE DRAWINGS

FIG. 5 illustrates a diagram presenting specifications, observation results, and a comprehensive evaluation of prototypes corresponding to the multilayer ceramic capacitor illustrated in FIGS. 2A and 2B.

DETAILED DESCRIPTION OF THE PREFERRED EMBODIMENT

Figure 1A:
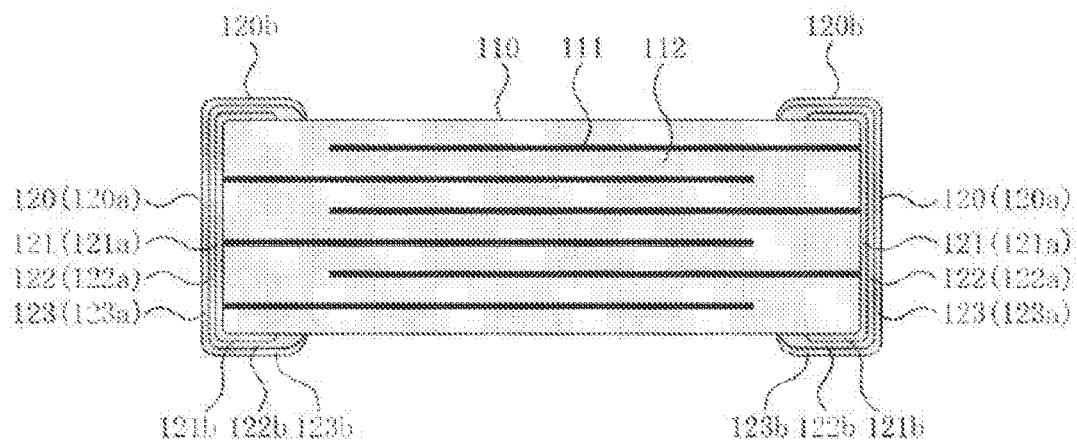
FIG. 1A illustrates a longitudinal sectional view of a multilayer ceramic capacitor presenting a conventional example.
Figure 1B:
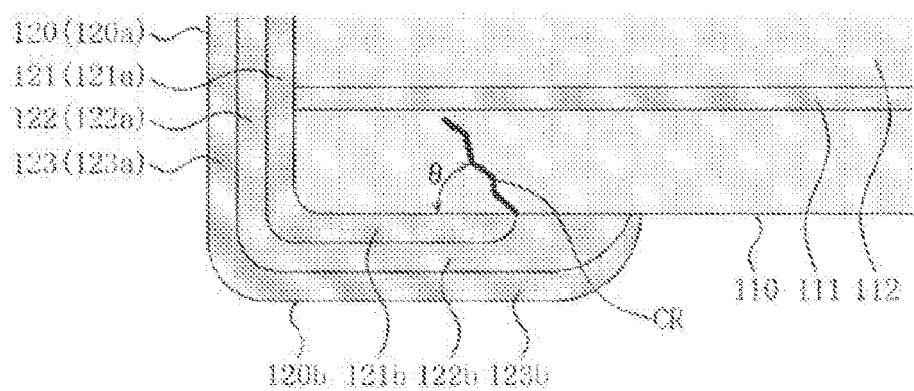
FIG. 1B illustrates elements on a larger scale in FIG. 1A.

In the following description, for the sake of convenience, the opposing direction of the two faces opposed to each other in a ceramic component body 10 (corresponding to the crosswise direction in FIG. 1A and FIG. 1B) is referred to as "first direction d1," the opposing direction of other two faces opposed to each other (corresponding to the vertical direction in FIG. 1A) is referred to as "second direction d2," and the opposing direction of the remaining two faces opposed to each other (corresponding to the vertical direction in FIG. 1B) is referred to as "third direction d3." Furthermore, the dimension along the first direction d1 of each constituent is referred to as "first direction dimension D1 [symbol of constituent]," the dimension along the second direction d2 is referred to as "second direction dimension D2 [symbol of constituent]," and the dimension along the third direction d3 is referred to as "third direction dimension D3 [symbol of constituent]."

Note that, in explanation of dimensions of an internal electrode layer 11, a dielectric layer 12, an underlying metal layer 21, an intermediate metal layer 22, a conductive resin layer 23, and an external metal layer 24, a term "thickness" is used in combination for the purpose of promoting understanding. In addition, a numerical value referred as each dimension means a design basic dimension, but does not include a dimensional tolerance in production.

First, a basic structure in a case of applying the present disclosure to a multilayer ceramic capacitor MLCC will be explained with reference to FIGS. 2A and 2B.

The multilayer ceramic capacitor MLCC includes the rectangular parallelepiped ceramic component body 10 and external electrodes 20 on respective two ends opposed to each other in the first direction d1 of the ceramic component body 10, and each external electrode 20 has the conductive resin layer 23 thereinside. Incidentally, a size of the multilayer ceramic capacitor MLCC i.e. the first direction dimension D1 [MLCC] ranges e.g. 400 to 3700 μm, the second direction dimension D2 [MLCC] ranges e.g. 200 to 2800 μm, and the third direction dimension D3 [MLCC] ranges e.g. 30 to 2800 μm.

The ceramic component body 10 includes a capacitance portion (symbol is omitted) in which a plurality of rectangular internal electrode layers 11 (total of 20 layers in the figure) are laminated through the dielectric layers 12 (total of 19 layers in the figure) in the third direction d3, and the capacitance portion (symbol is omitted) is surrounded by dielectric margin portions 13 and 14 on both sides in the third direction d3 and the dielectric margin portions 15 and 16 on both sides in the second direction d2. The plurality of internal electrode layers 11 are alternately shifted in the first direction d1, i.e. one end margin in the first direction d1 of the odd-numbered internal electrode layer 11 from the top in FIG. 2B (the left end margin in FIG. 2B) is connected to one of the external electrodes 20 (the left external electrode 20 in FIG. 2B), and another end margin in the first direction d1 of the even-numbered internal electrode layer 11 from the top in FIG. 2B (the right end margin in FIG. 2B) is connected to the other external electrode 20 (the right external electrode 20 in FIG. 2B).

A principal component of each internal electrode layer 11 is preferably a metal selected from nickel, copper, palladium, platinum, silver, gold, an alloy thereof, and the like. Principal components of the dielectric layer 12 and respective dielectric margin portions 13 to 16 are preferably dielectric ceramics selected from barium titanate, strontium titanate, calcium titanate, magnesium titanate, calcium zirconate, calcium titanate zirconate, barium zirconate, titanium oxide, and the like. Incidentally, a thickness of each internal electrode layer 11 ranges e.g. 0.3 to 1.5 μm, and a thickness of each dielectric layer 12 ranges e.g. 0.5 to 4.0 μm.

Figure 2A:
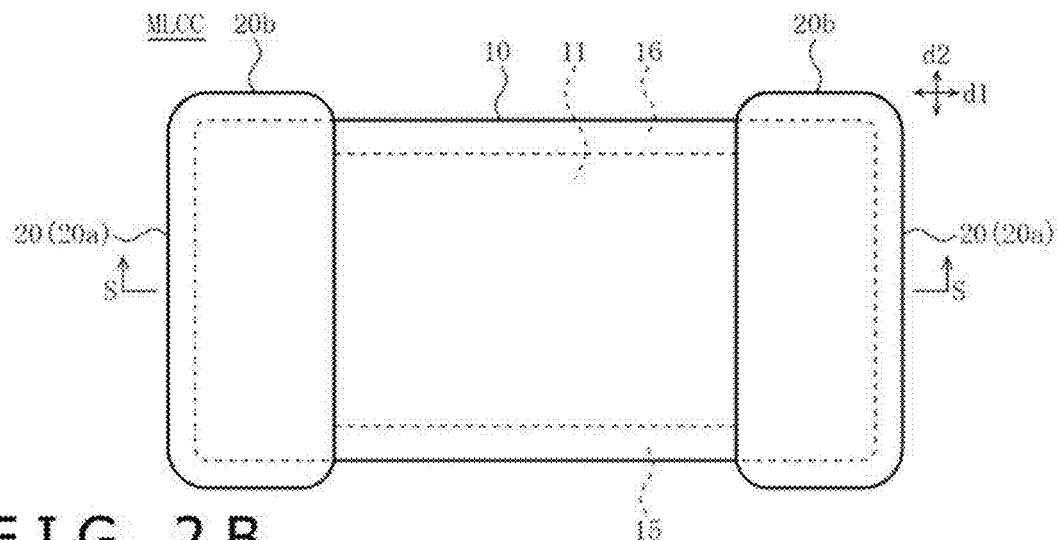
FIG. 2A illustrates a plane view of the multilayer ceramic capacitor presenting a basic structure in a case of applying the present disclosure to the multilayer ceramic capacitor.
Figure 2B:
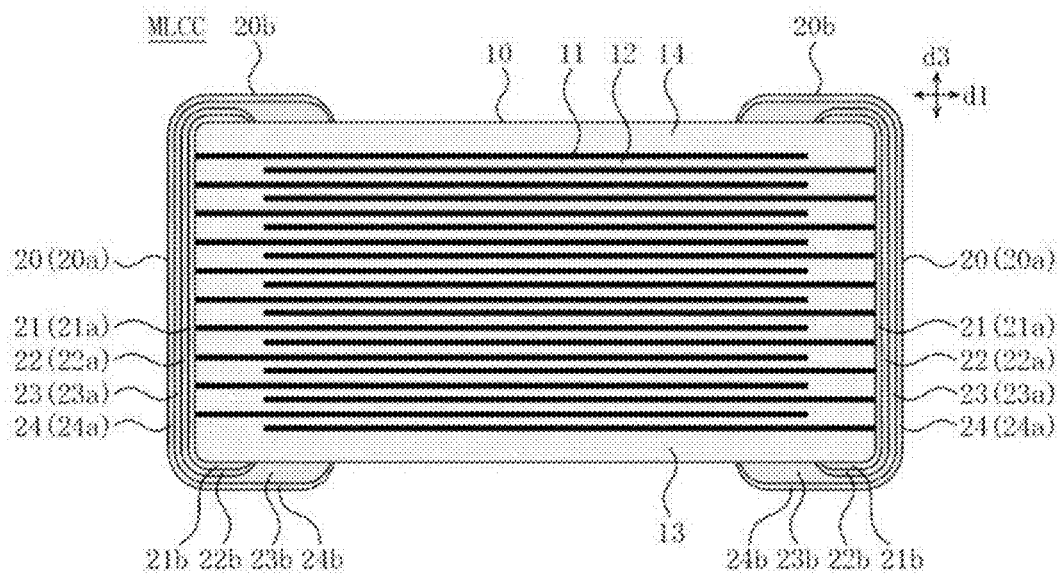
FIG. 2B illustrates an S-S line sectional view in FIG. 2A.

Although a total of 20 internal electrode layers 11 are drawn for the sake of convenience of illustration in FIG. 2B, the number of the internal electrode layers 11 and the first direction dimension D1 [11] and the second direction dimension D2 [11] of each internal electrode layer 11 can be arbitrarily changed depending on the size, the desired capacitance value, and the like of the multilayer ceramic capacitor MLCC. In addition, the principal component of the respective dielectric layers 12 is not necessarily the same as the principal component of the respective dielectric margin portions 13 to 16. For example, the principal components of the respective dielectric layers 12 and the respective dielectric margin portions 15 and 16 may be different from the principal component of the respective dielectric margin portions 13 and 14, or otherwise the principal components of the respective dielectric layers 12 and the respective dielectric margin portions 15 and 16, the principal component of the dielectric margin portion 13, and the principal component of the dielectric margin portion 14 may be different from each other.

Each of the external electrodes 20 has a rectangular end face portion 20a on each end face in the first direction d1 of the ceramic component body 10, and a rectangular cylindrical wraparound portion 20b on the respective parts of four faces around the end face, which are continuously formed. That is, each external electrode 20 is a five-face type external electrode, and the lamination direction of the internal electrode layer 11 is the third direction d3, and therefore one (bottom part or top part in FIG. 2B) of two parts (parts with a rectangular outer face) facing each other in the third direction d3 of each wraparound portion 20b is used as a mounting side part (part facing a conductive pad corresponding to the external electrode of the circuit board). In addition, each external electrode 20 is composed of the underlying metal layer 21, the intermediate metal layer 22, the conductive resin layer 23, and the external metal layer 24.

Each underlying metal layer 21 has a rectangular end face portion 21a covering each end face in the first direction d1 of the ceramic component body 10, and a rectangular cylindrical wraparound portion 21b covering the respective parts of four faces around the end face (both end faces in the second direction d2 and both end faces in the third direction), which are continuously formed. In addition, each intermediate metal layer 22 has a rectangular end face portion 22a covering each end face portion 21a of the underlying metal layer 21, and a rectangular cylindrical wraparound portion 22b covering each wraparound portion 21b of the underlying metal layer 21, which are continuously formed. Furthermore, each conductive resin layer 23 has a rectangular end face portion 23a covering each end face portion 22a of the intermediate metal layer 22, and a rectangular cylindrical wraparound portion 23b covering each wraparound portion 22b of the intermediate metal layer 22, which are continuously formed. A value obtained by subtracting a thickness of the end face portion 23a from the first direction dimension D1 [22b] of the wraparound portion 23b is larger than the first direction dimension D1 [22b] of the wraparound portion 22b of the intermediate metal layer 22. Furthermore, each external metal layer 24 has a rectangular end face portion 24a covering each end face portion 23a of the conductive resin layer 23, and a rectangular cylindrical wraparound portion 24b covering each wraparound portion 23b of the conductive resin layer 23, which are continuously formed.

A principal component of each underlying metal layer 21 is preferably a metal selected from nickel, copper, palladium, platinum, silver, gold, an alloy thereof, and the like. Additionally, in the preparation method for each underlying metal layer 21, preferably a metal paste is applied and baked by a dipping method, a printing method, or the like. Needless to say, each of the underlying metal layer 21 can also be prepared by a dry plating method such as sputtering and vacuum deposition. Incidentally, the thicknesses of the end face portion 21a and the wraparound portion 21b of each underlying metal layer 21 vary e.g. 1 to 10 μm, and the first direction dimension D1 [21b] of the wraparound portion 21b of each underlying metal layer 21 ranges e.g. 1/50 to 1/10 of the first direction dimension D1 [MLCC] of the multilayer ceramic capacitor MLCC.

A principal component of each intermediate metal layer 22 is preferably a metal selected from copper, tin, nickel, gold, zinc, an alloy thereof, and the like. It is desirable that the principal component is different from the principal component of the underlying metal layer 21, e.g. when the principal component of each underlying metal layer 21 is nickel, the principal component of each intermediate metal layer 22 is copper. Additionally, the preparation method for each intermediate metal layer 22 is preferably a wet plating method such as electroplating, or a dry plating method such as sputtering and vacuum deposition. Incidentally, the thicknesses of the end face portion 22a and the wraparound portion 22b of each intermediate metal layer 22 vary e.g. 1 to 5 μm. A range of the first direction dimension D1 [22b] of the wraparound portion 22b of each intermediate metal layer 22 is e.g. a range obtained by adding the thickness of the end face portion 22a to a range of the first direction dimension D1 [21b] of the wraparound portion 21b of the underlying metal layer 21.

The principal ingredient of each conductive resin layer 23 is preferably a mixture (conductive resin) of a thermosetting resin selected from an epoxy resin, a phenol resin, a urethane resin, a silicone resin, a polyimide resin, and the like, with a conductive filler composed of a metal selected from copper, tin, nickel, gold, zinc, an alloy thereof, and the like. The form of the conductive filler is preferably a spherical shape, a flat shape, a fiber shape, and the like, but is not particularly limited as long as the conductivity can be secured. In the preparation method for each conductive resin layer 23, preferably a conductive resin paste is applied and thermally cured by a dipping method, a printing method or the like. Incidentally, the thicknesses of the end face portion 23a of each conductive resin layer 23 varies e.g. 3 to 10 μm, and a thickness of a thick part of the wraparound portion 23b ranges e.g. 5 to 20 μm. A range of the first direction dimension D1 [23b] of the wraparound portion 23b of each conductive resin layer 23 is e.g. a range obtained by subtracting the thickness of the end face portion 24a from a range of the first direction dimension D1 [24b] of the wraparound portion 24b of the external metal layer 24 described hereinafter.

A principal component of each external metal layer 24 is preferably a metal selected from tin, copper, nickel, gold, zinc, an alloy thereof, and the like. Additionally, the preparation method for each external metal layer 24 is preferably a wet plating method such as electroplating, or a dry plating method such as sputtering and vacuum deposition. Incidentally, the thicknesses of the end face portion 24a and the wraparound portion 24b of each external metal layer 24 vary e.g. 1 to 5 μm, and the first direction dimension D1 [24b] of the wraparound portion 24b of each external metal layer 24 ranges e.g. 1/8 to 1/3 of the first direction dimension D1 [MLCC] of the multilayer ceramic capacitor MLCC.

Although the monolayer external metal layer 24 is drawn in FIG. 2B, the external metal layers 24 may be composed of a bilayer metal layer. In this case, it is desirable that the principal component of the internal metal layer is different from the principal component of the external metal layer, e.g. the principal component of the internal metal layer is nickel, and the principal component of the external metal layer is tin.

Next, features in a case of applying the present disclosure to the multilayer ceramic capacitor MLCC illustrated in FIGS. 2A and 2B will be described with reference to FIG. 3 (elements on a larger scale in FIG. 2B). Incidentally, this explanation is given on the assumption that the wraparound portion 20b of each external electrode 20 on the lower part in FIG. 2B is used as the mounting side part (part facing the conductive pad corresponding to the external electrode of the circuit board).

Figure 3:
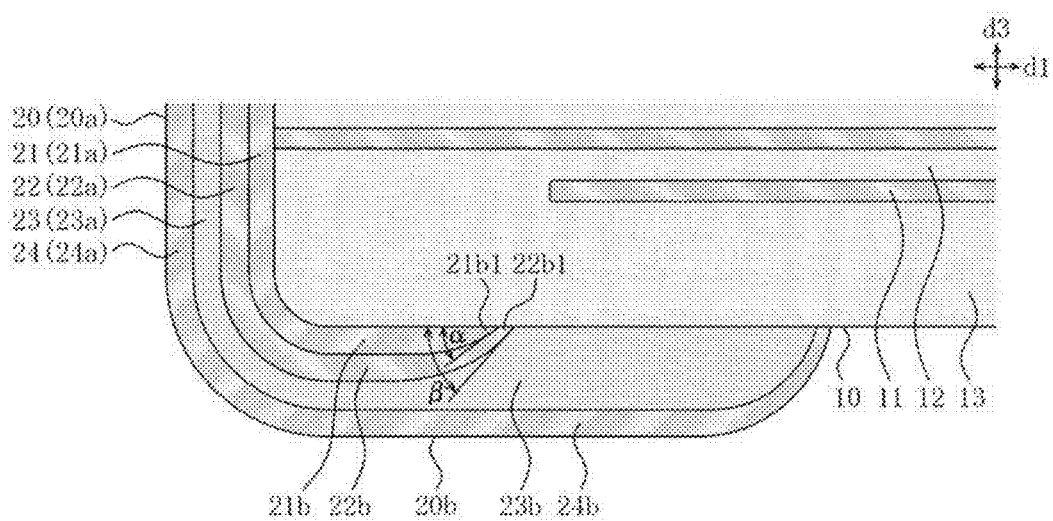
FIG. 3 illustrates elements on a larger scale in FIG. 2B.

An angle $\alpha$ illustrated in FIG. 3 is a tip angle between an outer face of a tip portion 21b1 on the mounting side part (the lower side part in FIG. 2B) of the wraparound portion 21b of the underlying metal layer 21 and the surface (the lower end face of FIG. 2B) of the ceramic component body 10, on the mounting side part (lower part in FIG. 2B) of the wraparound portion 20b of each external electrode 20. In addition, an angle $\beta$ illustrated in FIG. 3 is a tip angle between an outer face of a tip portion 22b1 on the mounting side part (the lower side part in FIG. 2B) of the wraparound portion 22b of the intermediate metal layer 22 and the surface (the lower end face of FIG. 2B) of the ceramic component body 10, on the mounting side part (lower part in FIG. 2B) of the wraparound portion 20b of each external electrode 20. Incidentally, as can be seen from FIG. 3, the tip portion 21b1 on the mounting side part of the wraparound portion 21b of the underlying metal layer 21 is covered by the tip portion 22b1 on the mounting side part of the wraparound portion 22b of the intermediate metal layer 22.

Features in a case of applying the present disclosure to the multilayer ceramic capacitor MLCC illustrated in FIGS. 2A and 2B consist in setting on the tip angle $\alpha$ and the tip angle $\beta$ described hereinbefore. Specifically, the first feature is:
F1: the tip angle $\alpha$ is 20° or smaller, and the tip angle $\beta$ is 20° or smaller ($\alpha \leq 20°$ & $\beta \leq 20°$); and
the second, third and fourth features are:
F2: the tip angle $\alpha$ is 3° or larger, and the tip angle $\beta$ is 1° or larger ($3° \leq \alpha$ & $1° \leq \beta$);
F3: the tip angle $\alpha$ is not more than the tip angle $\beta$ ($\alpha \leq \beta$);
F4: a value obtained by subtracting the tip angle $\alpha$ from the tip angle $\beta$ is 10° or smaller ($10° \leq \beta - \alpha$).

Hereinafter, an example of the production method for the multilayer ceramic capacitor MLCC illustrated in FIGS. 2A and 2B will be explained. Incidentally, the production method explained here is merely an example, and does not restrict the production method for the multilayer ceramic capacitor MLCC illustrated in FIGS. 2A and 2B.

In the production, a ceramic green sheet as a first sheet, and a second sheet obtained by forming an unbaked internal electrode layer pattern on the first sheet are prepared, the first sheet and the second sheet are appropriately laminated and thermally compression-bonded to form a multilayer sheet. Subsequently, the multilayer sheet is divided into chips corresponding to the ceramic component body 10, the chips are baked in an atmosphere and a temperature profile corresponding to the ceramic green sheet and the unbaked internal electrode layer, and the baked chips are ground with a barrel to prepare the ceramic component body 10. Subsequently, on each of the two ends opposed to each other in the first direction d1 of the ceramic component body 10, the underlying metal layer 21, the intermediate metal layer 22, the conductive resin layer 23 and the external metal layer 24 are sequentially formed by the method described hereinbefore. Incidentally, for the method in which the tip angle $\alpha$ of the tip portion 21b1 of the wraparound portion 21b of each underlying metal layer 21 and the tip angle $\beta$ of the tip portion 22b1 of the wraparound portion 22b of each intermediate metal layer 22 explained with reference to FIG. 3 are different from each other, a method described for supplementing difference of specifications in <<Prototype Specification>> described hereinafter can be appropriately adopted.

Next, specifications, observation results, and a comprehensive evaluation of prototypes supporting the features F1 to F4 will be explained with reference to FIG. 4 (elements on a larger scale in FIG. 3) and FIG. 5. As will be supplementarily explained hereinafter, the sizes of the prototypes explained here are merely examples, and the sizes do not restrict the features F1 to F4.

<<Prototype Specification>>

The specifications of prototypes TP1 to TP16 (multilayer ceramic capacitors corresponding to multilayer ceramic capacitor MLCC illustrated in FIGS. 2A and 2B) presented as "PROTOTYPE" in FIG. 5 are common in the following points:

as for the sizes of the prototypes TP1 to TP16, the first direction dimension D1 [TP1 to TP16] is 1000 μm, and the second direction dimension D2 [TP1 to TP16] and the third direction dimension D3 [TP1 to TP16] is 500 μm;

a part exclusive of the internal electrode layer 11 in the ceramic component body 10 is composed mainly of barium titanate, and the internal electrode layer 11 is composed mainly of nickel;

the first direction dimension D1 [20] of each external electrode 20 is 200 μm;

the underlying metal layer 21 of each external electrode 20 is a baked metal layer composed mainly of nickel, in which the end face portion 21a and the wraparound portion 21b have thicknesses of 3 μm, and the first direction dimension D1 [21b] of the wraparound portion 21b is 60 μm;

the intermediate metal layer 22 of each external electrode 20 is an electroplated metal layer composed mainly of copper, in which the end face portion 22a and the wraparound portion 22b have thicknesses of 1 μm, and the first direction dimension D1 [22b] of the wraparound portion 22b is 62 μm;

the conductive resin layer 23 of each external electrode 20 is a thermosetting conductive resin composed mainly of an epoxy resin and a copper conductive filler, in which the end face portion 23a has a thickness of 3 μm, the thick part of the wraparound portion 22b has a thickness of 7 μm, and the first direction dimension D1 [23b] of the wraparound portion 23b is 198 μm;

the external metal layer 24 of each external electrode 20 is an electroplated metal layer composed mainly of tin, in which the end face portion 24a and the wraparound portion 24b have thicknesses of 1 μm, and the first direction dimension D1 [24b] of the wraparound portion 22b is 200 μm (=first direction dimension D1 [20] of each external electrode 20);

but, as can be seen from the "TIP ANGLE α" and "TIP ANGLE β" in FIG. 5, the specifications are different in the following point:

the tip portions 21b1 on the mounting side parts of the wraparound portions 21b of the underlying metal layers 21 of the respective external electrodes 20 have different "TIP ANGLES α" in a range of 1° to 31°, and the tip portions 22b1 on the mounting side parts of the wraparound portions 22b of the intermediate metal layers 22 have different "TIP ANGLES β" in a range of 0.5° to 44°.

As a supplement to the difference in the specifications described hereinbefore, since the underlying metal layers 21 of the respective external electrodes 20 of the prototypes TP1 to TP16 are baked metal layers composed mainly of nickel, different "TIP ANGLES α" are obtained by changing a viscosity of the nickel paste, a ratio of common materials, a ratio of the additives, and the like, and additionally changing a temperature profile during baking. In addition, since the intermediate metal layers 22 of the respective external electrodes 20 of the prototypes TP1 to TP16 are electroplated metal layers composed mainly of copper, different "TIP ANGLES β" are obtained by changing conditions such as a pH and a temperature of a plating liquid, a plating current density, and a plating time.

When the intermediate metal layers 22 of the respective external electrodes 20 are sputtered metal layers composed mainly of copper, different "TIP ANGLES β" can be obtained by changing a distance, an angle and the like of the object to be prepared (the ceramic component body 10 on which the underlying metal layer 21 has been made) relative to a target (including a case of rotating the object to be prepared), and additionally by changing conditions such as a gas pressure, a sputtering power, and a sputtering time.

Figure 4:
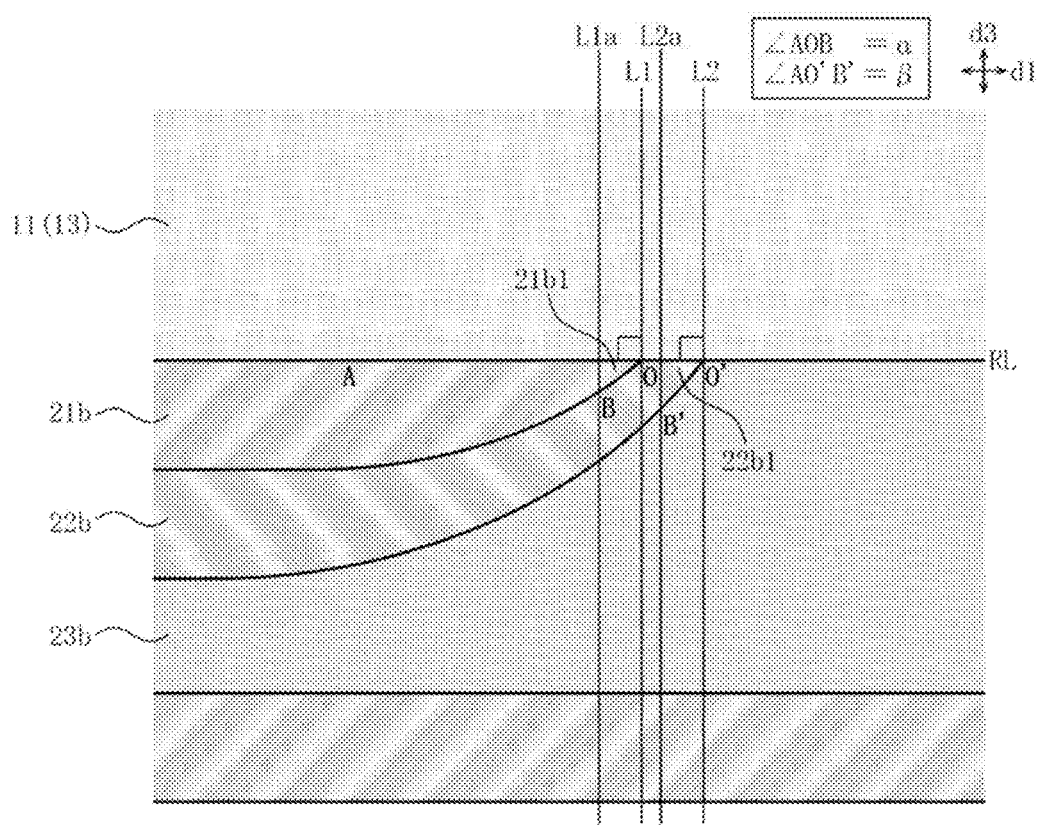
FIG. 4 illustrates elements on a larger scale in FIG. 3 for explaining a measurement method for angles α and β illustrated in FIG. 3.

Furthermore, as a supplement to the measurement method for the angles α and β as the bases of the "TIP ANGLE α" and the "TIP ANGLE β" in FIG. 5 with reference to FIG. 4, the angles α and β are measured in a process that using an electron microscope e.g. a desktop microscope (TM3030 Plus, manufactured by Hitachi High-Technologies Corporation), a reference line RL is drawn along the surface of the ceramic component body 10 (lower end face in FIG. 2B) on a polished cross section corresponding to FIG. 4, and a point A is located inside the wraparound portion 21b on the reference line RL in <S11>; a first straight line L1 passing through the tip of the tip portion 21b1 on the mounting side part of the wraparound portion 21b of the underlying metal layer 21 and orthogonal to the reference line RL is drawn, a second straight line L2 passing through the tip of the tip portion 22b1 on the mounting side part of the wraparound portion 22b of the intermediate metal layer 22 and orthogonal to the reference line RL is drawn, an intersection of the first straight line L1 and the reference line RL is defined O, and an intersection of the second straight line L2 and the reference line RL is defined O' in <S12>; a first auxiliary line L1a parallel to the first straight line L1 and 1 μm away from the first straight line L1 to the left in the figure is drawn, a second auxiliary line L2a parallel to the second straight line L2 and 1 μm away from the second straight line L2 to the left in the figure is drawn, an intersection of the first auxiliary line L1a and the outer face of the tip portion 21b1 is defined B, and an intersection of the second auxiliary line L2a and the outer face of the tip portion 22b1 is defined B' in <S13>; and an angle formed by the point A, the point O and the point B (=∠AOB) is measured and defined as the angle α, and an angle formed by the point A, the point O' and the point B' (=∠AOB) is measured and defined as the angle β in <S14>.

Furthermore, as a supplement to the "TIP ANGLE α" and "TIP ANGLE β" in FIG. 5, the "TIP ANGLE α" and "tip angle β" are measured in a process that for each of the prepared prototypes TP1 to TP16, the angle β and angle β are measured on each of four cross sections in the second directions d2 at different positions (four polished cross sections corresponding to FIG. 4), specifically four cross sections obtained at the central portions corresponding to 30% to 50% of the second direction dimensions D2 [TP1 to TP16] of the prototypes TP1 to TP16 (four polished cross sections corresponding to FIG. 4) in <S21>; and an average value of the measured values of the total of four angles α is defined as "TIP ANGLE α," and an average value of the measured values of the total of four angles β is defined as "TIP ANGLE β" in <S22>. That is, the prototype TP1 is a prototype in which the average value of the angle α corresponds to 1° described as the "TIP ANGLE α" in FIG. 5 and the average value of the angle β corresponds to 0.5° described as the "TIP ANGLE β" in FIG. 5, and the other prototypes TP2 to TP16 are prototypes in which the average value of the angle α corresponds to the value described as the "TIP ANGLE α" in FIG. 5 and the average value of the angle β corresponds to the value described as the "TIP ANGLE β" in FIG. 5.

<<Observation Result>>

The "CONTINUITY" in FIG. 5 indicates results of observing each of the continuity of the tip portion 21b1 on the mounting side part of the wraparound portion 21b of the underlying metal layer 21, and the continuity of the tip portion 22b1 on the mounting side part of the wraparound portion 22b of the intermediate metal layer 22, for each of the 30 prototypes corresponding to the respective prototypes TP1 to TP16. Incidentally, for this observation, an electron microscope e.g. a desktop microscope (TM3030 Plus, manufactured by Hitachi High-Technologies Corporation) is used. In this observation, when even one of the 30 prototypes exhibits breakage, cracks or the like on at least one of the tip portion 21b1 on the mounting side part of the wraparound portion 21b of the underlying metal layer 21 and the tip portion 22b1 on the mounting side part of the wraparound portion 22b of the intermediate metal layer 22, the corresponding prototype is indicated as "NO CONTINUITY (BAD)." When none of 30 prototypes exhibits breakage, cracks or the like, the corresponding prototype is indicated as "CONTINUITY (GOOD)."

The "CRACKING" in FIG. 5 indicates results of observing the presence of cracks on each ceramic component body 10 after a deflection test described hereinafter for each of the 30 prototypes corresponding to the respective prototypes TP1 to TP16. Incidentally, for this observation, an optical microscope e.g. a digital microscope (VHX6000, manufactured by KEYENCE CORPORATION) is used. In this observation, when any of 30 prototypes exhibits a crack CR (see FIG. 1B) on the ceramic component body 10, the corresponding prototype is indicated as n/30 (n is an integer of 1 or larger), and when none of 30 prototypes exhibits the crack CR on the ceramic component body 10, the corresponding prototype is indicated as 0/30. Incidentally, since the prototypes TP1 and TP2 are rated as "NO CONTINUITY (BAD)" in "CONTINUITY" described hereinbefore, the "CRACKING" is not observed.

As a supplement to the deflection test described hereinbefore, the test is carried out by a process that each of the 30 prototypes TP1 to TP16 is soldered to one side of a glass epoxy substrate in compliance with JIS-C-6484, and then both sides 45 mm away from a soldered site of the prototype on one side of the glass epoxy substrate are supported by bridges, and in this state, the other side of the glass epoxy substrate facing the soldered prototype is pressed downward and deformed by a pressing jig (a pressing part is a curved face with a curvature radius of 5 mm) at a constant speed of 0.5 mm/sec, and the pressing is released when the capacity of the prototype is decreased by 12.5% or more during the deformation step.

Incidentally, the method for releasing the pressing in the deflection test may also be carried out by a process that the other side of the glass epoxy substrate facing the soldered prototype is pressed downward and deformed by a pressing jig at a constant speed, and the pressing is released when the deformation amount of the glass epoxy substrate reaches a predetermined value e.g. 10 mm.

The "CRACK ANGLE θ" in FIG. 5 indicates results that each of the 30 prototypes corresponding to the respective prototypes TP1 to TP16 is subjected to the deflection test, and then, for any of prototypes (prototypes TP12 to TP16) exhibiting the crack CR (see FIG. 1B) on each ceramic component body 10, an angle θ of the crack CR is measured. Incidentally, as can be seen from the values described in "CRACK ANGLE θ" of the prototypes TP12 to TP16, these prototypes TP12 to TP16 have the same size, and therefore the respective "CRACK ANGLES θ" are approximate to each other, as described in BACKGROUND.

As a supplement to the "CRACK ANGLE θ" in FIG. 5, the "CRACK ANGLE θ" is measured by a process that, using an optical microscope e.g. a digital microscope (VHX6000 manufactured by KEYENCE CORPORATION), for each of the prototype TP12 to TP16 exhibiting the crack CR (see FIG. 1B) on the ceramic component body 10, a reference line RL is drawn along the surface of the ceramic component body 10 (lower end face in FIG. 2B) on a polished cross section corresponding to FIG. 4, and an approximate line along the crack CR is drawn, an angle θ between the reference line RL and the approximate line is measured in <S31>; and for a prototype exhibiting multiple "CRACKINGS," an average value of a plurality of angles θ obtained by measurement is defined as "CRACK ANGLE θ," and for a prototype exhibiting single "CRACKING," an angle θ obtained by measurement is defined as "TIP ANGLE θ" in <S32>.

<<Comprehensive Evaluation>>

From the observation result of "CONTINUITY" in FIG. 5, the prototypes TP1 and TP2 exhibit breakage, cracks or the like on at least one of the tip portion 21b1 on the mounting side part of the wraparound portion 21b of the underlying metal layer 21 and the tip portion 22b1 on the mounting side part of the wraparound portion 22b of the intermediate metal layer 22. However, in actual observation, although the prototypes TP1 and TP2 exhibit breakage, cracks or the like on the tip portion 21b1 of the mounting side part of the wraparound portion 21b of the underlying metal layer 21, the prototype TP2 does not exhibit breakage, cracks or the like on the tip portion 22b1 on the mounting side part of the wraparound portion 22b of the intermediate metal layer 22. Thus the actual lower limit value of the "TIP ANGLE α" is 3°, and the actual lower limit value of the "TIP ANGLE β" is 1°.

From the observation results of "CRACKING" in FIG. 5, the prototypes TP3 to TP11 do not exhibit the crack CR (see FIG. 1B) on the ceramic component body 10, and therefore the actual upper limit value of the "TIP ANGLE α" is 20°, and the actual upper limit value of the "TIP ANGLE β" is 20°. That is, in combination with the lower limit values based on the continuity described hereinbefore, the "TIP ANGLE α" preferably ranges 3° to 20°, and the "TIP ANGLE β" preferably ranges 1° to 20°.

In addition, from the observation results of "CRACKING" in FIG. 5, particularly from the observation results of the prototypes TP12 and TP13, the number of "CRACKINGS" on the prototype TP13 having the "TIP ANGLE α" larger than the "TIP ANGLE β" is more than the number of "CRACKINGS" on the prototype TP12 having the "TIP ANGLE α" smaller than the "TIP ANGLE β," and therefore, as for the dimensional relationship between the "TIP ANGLE α" and the "TIP ANGLE β," it is preferable that the "TIP ANGLE α" is not larger than the "TIP ANGLE β" in consideration of the dimensional relationships between the "TIP ANGLE α" and the "TIP ANGLE β" of the prototypes TP3 to TP11.

Furthermore, from the observation results of "CRACKING" in FIG. 5, particularly from the observation results of the prototypes TP15 and TP16, even if the "TIP ANGLE α" is not larger than the "TIP ANGLE β," the number of the "CRACKINGS" on the prototype TP16 in which an angular difference between the "TIP ANGLE α" and the "TIP ANGLE β" is larger than 10° is remarkably larger than the number of the "CRACKINGS" on the prototype TP15 in which an angular difference between the "TIP ANGLE α" and the "TIP ANGLE β" is 10°, and therefore, as the angular difference in a case of the "TIP ANGLE α" not larger than the "TIP ANGLE β," a value obtained by subtracting the "TIP ANGLE α" from the "TIP ANGLE β" is preferably 10° or smaller.

Incidentally, in observation of the "CRACKING" and measurement of the "CRACK ANGLE θ" in FIG. 5, when comparing the prototypes TP3 to TP11 exhibiting no crack CR (see FIG. 1B) on the ceramic component body 10 with the prototypes TP12 to TP16 exhibiting the crack CR, it has been confirmed that the prototypes TP3 to TP11 exhibiting no crack CR on the ceramic component body 10 has a tendency that the mounting side part of the wraparound portion 23b of the conductive resin layer 23 is peeled off from the ceramic component body 10. That is, it is assumed that even when the soldered parts of the prototypes TP3 to TP11 is stressed in the deflection test described hereinbefore, the stress is converted into a force for peeling the mounting side part of the wraparound portion 23b of the conductive resin layer 23, and therefore the crack CR is not caused on the ceramic component body 10.

Based on this assumption, predicted problems can be solved by preventing occurrence of the crack CR (see FIG. 1B) on the ceramic component body 10 as much as possible, as long as at least the feature F1 described hereinbefore is satisfied.

Next, specifications, observation results, and a comprehensive evaluation of another prototype for supporting the features F1 to F4 described hereinbefore will be supplementarily explained.

Specifications of other prototypes TP21 to TP36 (multilayer ceramic capacitors corresponding to the multilayer ceramic capacitor MLCC illustrated in FIGS. 2A and 2B) are the same as the specifications of the prototypes TP1 to TP16 except for each size i.e. the first direction dimension D1 [TP21 to TP36] of 1600 μm, the second direction dimension D2 [TP21 to TP36], and the third direction dimension D3 [TP21 to TP36] of 800 μm.

Although illustration is omitted, "CONTINUITY," "CRACKINGS" and "CRACK ANGLE" are observed and measured in the same manner as described hereinbefore for the other prototypes TP21 to TP36, and as a result, it has been confirmed that the same results can be obtained for the "CONTINUITY" and "CRACKINGS," i.e. the same results can be obtained also for "COMPREHENSIVE EVALUATION." Incidentally, with regard to "CRACK ANGLE θ," it has been also confirmed that although "CRACK ANGLES θ" of the other prototypes TP32 to TP36 are smaller by approximately 5° than "CRACK ANGLES θ" of the prototypes TP12 to TP16, these prototypes TP32 to TP36 have the same size, and therefore the respective "CRACK ANGLES θ" are approximate to each other, as also described in BACKGROUND.

That is, any multilayer ceramic capacitor having the same basic structure as of the multilayer ceramic capacitor MLCC illustrated in FIGS. 2A and 2B can prevent occurrence of the crack CR (see FIG. 1B) on the ceramic component body as much as possible to solve expected problems, as long as at least the feature F1 is satisfied, even if the multilayer ceramic capacitor has different sizes i.e. the first direction dimension D1 [multilayer ceramic capacitor], the second direction dimension D2 [multilayer ceramic capacitor], and the third direction dimension D3 [multilayer ceramic capacitor].

In addition, based on the assumption and the comprehensive evaluation of the other prototypes described hereinbefore, occurrence of cracks is considered to depend on the "TIP ANGLE α" and "TIP ANGLE β," and thus even another type of ceramic electronic component having a ceramic component body and respective external electrodes similar to those of the multilayer ceramic capacitor MLCC illustrated in FIGS. 2A and 2B, e.g. a multilayer ceramic varistor, a multilayer ceramic inductor, a multilayer ceramic capacitor array, a multilayer ceramic LC composite component, a multilayer ceramic LCR composite component, etc. can prevent occurrence of the crack CR (see FIG. 1B) on the ceramic component body as much as possible to solve expected problems as long as at least the feature F1 is satisfied.

Next, application of the features F1 to F4 to other portions of the wraparound portion (20b) of each external electrode (20) will be supplementarily explained.

In the multilayer ceramic capacitor MLCC illustrated in FIGS. 2A and 2B, one (the lower part or the upper part in FIG. 2B) of the two parts facing in the third direction d3 of the wraparound portion 20b of each external electrode 20 can be used as the mounting side part (part facing the conductor pad corresponding to the external electrode of the circuit board), and therefore it is desirable that at least the feature F1 is applied to not only the lower part of FIG. 2B but also the upper part of FIG. 2B.

Furthermore, in another type of ceramic electronic component having a ceramic component body similar to the multilayer ceramic capacitor MLCC illustrated in FIGS. 2A and 2B and each external electrode, one of two parts facing each other in a third direction d3 of a wraparound portion of each external electrode and two parts facing each other in a second direction d2 may be used as a mounting side part (part facing the conductor pad corresponding to the external electrode of the circuit board), and therefore in such a case, it is desirable that at least the feature F1 is applied to all four parts of the wraparound portion of each external electrode.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2018-097734 filed in the Japan Patent Office on May 22, 2018, the entire content of which is hereby incorporated by reference.

What is claimed is:

1. A ceramic electronic component comprising:
external electrodes having conductive resin layers thereinside on respective two ends opposed to each other in a rectangular parallelepiped ceramic component body, wherein
when an opposing direction of two faces opposed to each other in the ceramic component body is defined as a first direction, an opposing direction of other two faces opposed to each other is defined as a second direction, an opposing direction of the remaining other two faces opposed to each other is defined as a third direction, and dimensions along respective directions are defined as a first direction dimension, a second direction dimension, and a third direction dimension respectively,
each of the external electrodes includes
<1> an underlying metal layer having an end face portion covering each end face in the first direction of the ceramic component body and a wraparound portion covering respective parts of the remaining four faces around the each end face that are continuously formed;
<2> an intermediate metal layer having an end face portion covering each end face portion of the underlying metal layer and a wraparound portion covering each wraparound portion of the underlying metal layer that are continuously formed;
<3> a conductive resin layer having an end face portion covering each end face portion of the intermediate metal layer and a wraparound portion covering each wraparound portion of the intermediate metal layer that are continuously formed, in which a value obtained by subtracting a thickness of the end face portion of the conductive resin layer from the wraparound portion of the conductive resin layer in the first direction dimension is larger than a thickness of the wraparound portion of the intermediate metal layer in the first direction dimension; and <4> an external metal layer having an end face portion covering each end face portion of the conductive resin layer and a wraparound portion covering each wraparound portion of the conductive resin layer that are continuously formed, and on at least a mounting side part of the wraparound portion of the underlying metal layer and on at least a mounting side part of the wraparound portion of the intermediate metal layer, a tip angle α between an outer face of a tip portion of the wraparound portion of the underlying metal layer and a surface of the ceramic component body is 20° or smaller, and a tip angle β between an outer face of a tip portion of the wraparound portion of the intermediate metal layer and the surface of the ceramic component body is 20° or smaller.

2. The ceramic electronic component according to claim 1, wherein the tip portion of the wraparound portion of the underlying metal layer is covered by the tip portion of the wraparound portion of the intermediate metal layer.

3. The ceramic electronic component according to claim 1, wherein the tip angle α is 3° or larger, and the tip angle β is 1° or larger.

4. The ceramic electronic component according to claim 1, wherein the tip angle α is not larger than the tip angle β.

5. The ceramic electronic component according to claim 1, wherein a value obtained by subtracting the tip angle α from the tip angle β is 10° or smaller.

6. The ceramic electronic component according to claim 1, wherein
the underlying metal layer is formed by applying and baking a metal paste,
the intermediate metal layer is formed by a wet or dry plating method,
the conductive resin layer is formed by applying and thermally curing a conductive resin, and
the external metal layer is formed by a wet or dry plating method.

7. The ceramic electronic component according to claim 1, wherein the ceramic electronic component is a multilayer ceramic capacitor.

8. A production method for a ceramic electronic component comprising:
external electrodes having conductive resin layers thereinside on respective two ends opposed to each other in a rectangular parallelepiped ceramic component body, wherein
when an opposing direction of two faces opposed to each other in the ceramic component body is defined as a first direction, an opposing direction of other two faces opposed to each other is defined as a second direction, an opposing direction of the remaining other two faces opposed to each other is defined as a third direction, and dimensions along respective directions are defined as a first direction dimension, a second direction dimension, and a third direction dimension respectively,
each of the external electrodes includes
<1> an underlying metal layer having an end face portion covering each end face in the first direction of the ceramic component body and a wraparound portion covering respective parts of the remaining four faces around the each end face that are continuously formed;

<2> an intermediate metal layer having an end face portion covering each end face portion of the underlying metal layer and a wraparound portion covering each wraparound portion of the underlying metal layer that are continuously formed;

<3> a conductive resin layer having an end face portion covering each end face portion of the intermediate metal layer and a wraparound portion covering each wraparound portion of the intermediate metal layer that are continuously formed, in which a value obtained by subtracting a thickness of the end face portion of the conductive resin layer from the wraparound portion of the conductive resin layer in the first direction dimension is larger than a thickness of the wraparound portion of the intermediate metal layer in the first direction dimension; and <4> an external metal layer having an end face portion covering each end face portion of the conductive resin layer and a wraparound portion covering each wraparound portion of the conductive resin layer that are continuously formed, and on at least a mounting side part of the wraparound portion of the underlying metal layer and on at least a mounting side part of the wraparound portion of the intermediate metal layer, a tip angle α between an outer face of a tip portion of the wraparound portion of the underlying metal layer and a surface of the ceramic component body is 20° or smaller, and a tip angle β between an outer face of a tip portion of the wraparound portion of the intermediate metal layer and the surface of the ceramic component body is 20° or smaller.

9. The ceramic electronic component production method according to claim 8, wherein the tip portion of the wraparound portion of the underlying metal layer is covered by the tip portion of the wraparound portion of the intermediate metal layer.

10. The ceramic electronic component production method according to claim 8, wherein the tip angle α is 3° or larger, and the tip angle β is 1° or larger.

11. The ceramic electronic component production method according to claim 8, wherein the tip angle α is not larger than the tip angle β.

12. The ceramic electronic component production method according to claim 8, wherein a value obtained by subtracting the tip angle α from the tip angle β is 10° or smaller.

13. The ceramic electronic component production method according to claim 8, wherein
the underlying metal layer is formed by applying and baking a metal paste,
the intermediate metal layer is formed by a wet or dry plating method,
the conductive resin layer is formed by applying and thermally curing a conductive resin, and
the external metal layer is formed by a wet or dry plating method.

14. The ceramic electronic component production method according to claim 8, wherein the ceramic electronic component is a multilayer ceramic capacitor.

* * * * *